United States Patent
Zhang et al.

(10) Patent No.: US 9,916,392 B2
(45) Date of Patent: Mar. 13, 2018

(54) METHOD, SYSTEM, AND STORAGE MEDIUM FOR DISPLAYING MEDIA CONTENT APPLICABLE TO SOCIAL PLATFORM

(71) Applicant: TENCENT TECHNOLOGY (SHENZHEN) COMPANY LIMITED, Shenzhen (CN)

(72) Inventors: Zhenwei Zhang, Shenzhen (CN); Wenjie Zhang, Shenzhen (CN); Xuan Zhou, Shenzhen (CN); Youkun Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 213 days.

(21) Appl. No.: 14/733,843

(22) Filed: Jun. 8, 2015

(65) Prior Publication Data
US 2015/0269275 A1    Sep. 24, 2015

Related U.S. Application Data

(63) Continuation of application No. PCT/CN2013/084147, filed on Sep. 25, 2013.

(30) Foreign Application Priority Data

Dec. 7, 2012 (CN) .......................... 2012 1 0521441

(51) Int. Cl.
*G06F 17/22* (2006.01)
*G06F 17/30* (2006.01)
(Continued)

(52) U.S. Cl.
CPC ...... *G06F 17/30905* (2013.01); *G06F 3/0485* (2013.01); *G06F 3/04842* (2013.01)

(58) Field of Classification Search
CPC ....................................................... G06F 17/30
See application file for complete search history.

(56) References Cited

U.S. PATENT DOCUMENTS 7,392,473 B2 * 6/2008 Meunier ............ G06K 9/00469
715/247
2005/0262427 A1 * 11/2005 Cantwell ............ G06F 17/3089
715/208
(Continued)

FOREIGN PATENT DOCUMENTS

CN    101098344 A    1/2008
CN    101663891 A    3/2010
(Continued)

OTHER PUBLICATIONS

The State Intellectual Property Office of the People's Republic of China (SIPO) Office Action 1 for 201210521441.7 dated Jan. 30, 2015.
(Continued)

*Primary Examiner* — James J Debrow
(74) *Attorney, Agent, or Firm* — Anova Law Group, PLLC

(57) ABSTRACT

The present disclosure relates to the field of computer technologies, and discloses a method, system, and storage medium for displaying media content applicable to a social platform. The method includes: detecting an input operation about a dynamic area located around a media content displaying area; and responding to the input operation, and scrolling to display, according to a layout direction of media content loaded in the media content displaying area, the media content in the media content displaying area, where a width of the media content in a direction that is perpendicular to the layout direction of the media content is consistent with a width of the media content displaying area. Embodiments of the present invention do not need to intercept the
(Continued)

media content, and also do not need to display a clear and complete picture by using a large picture floating layer, so as to reduce a workload of the system effectively.

20 Claims, 5 Drawing Sheets

(51) Int. Cl.
*G06F 3/0485* (2013.01)
*G06F 3/0484* (2013.01)
*G06F 17/24* (2006.01)

(56) References Cited

U.S. PATENT DOCUMENTS

2007/0081179 A1* 4/2007 Nishida ............... G06F 17/275
 358/1.11
2009/0210827 A1* 8/2009 Brugler ............... G06F 9/4443
 715/854
2010/0029340 A1* 2/2010 Klassen ............ G06F 17/30905
 455/566
2014/0156567 A1* 6/2014 Scholtes ............... G06F 17/30
 706/12

FOREIGN PATENT DOCUMENTS

| CN | 101819594 A | 9/2010 |
| CN | 101853158 A | 10/2010 |
| CN | 102508592 A | 6/2012 |
| CN | 102665051 A | 9/2012 |
| CN | 103049183 A | 4/2013 |

OTHER PUBLICATIONS

The State Intellectual Property Office of the People's Republic of China (SIPO) Office Action 2 for 201210521441.7 dated Sep. 28, 2015.
The World Intellectual Property Organization (WIPO) International Search Report for PCT/CN2013/084147 dated Jan. 2, 2014.

* cited by examiner

METHOD, SYSTEM, AND STORAGE MEDIUM FOR DISPLAYING MEDIA CONTENT APPLICABLE TO SOCIAL PLATFORM

RELATED APPLICATION

This application is a continuation of PCT Application No. PCT/CN2013/084147, filed on Sep. 25, 2013, which claims priority to Chinese Patent Application No. 201210521441.7, filed with the Chinese Patent Office on Dec. 7, 2012, the entire contents of all of which are incorporated herein by reference.

FIELD OF THE TECHNOLOGY

The present disclosure generally relates to the field of computer technologies and, more particularly, to a method, system, and storage medium for displaying media content applicable to a social platform.

BACKGROUND OF THE DISCLOSURE

In a social platform such as a friend circle, a microblog, or personal space, when a size of a picture uploaded to the social platform by a user exceeds a picture displaying area, a system usually uses two methods to process and display the uploaded picture.

A first method is that the picture is intercepted for displaying according to a highest and widest size of the picture displaying area, where this method causes that the picture is not displayed completely, and the user has to click on the picture displayed in the picture displaying area before a clear and complete picture can be displayed in a large picture floating layer.

A second method is that the uploaded picture is scaled up by a geometric proportion according to the highest and widest size of the picture displaying area, so that the picture can be displayed in the picture displaying area completely, where this method causes that the picture is not displayed clearly, and the user has to click on the picture displayed in the picture displaying area before the clear and complete picture can be displayed in the large picture floating layer.

In the first method, however, the system has to intercept the picture and/or has to display the clear and complete picture by using the large picture floating layer, which increases a workload of the system; and in the second method, however, the system has to scale up the picture, and/or has to display the clear and complete picture by using the large picture floating layer, which increases the workload of the system in a same way.

SUMMARY

In the existing technology, a method for processing and displaying an uploaded picture not only reduces an operating cost, but also avoids a problem brought by picture intercepting and scaling up in a geometric proportion, which helps to reduce workload of a system.

In view of this, according to one aspect of the present invention, a method for displaying media content applicable to a social platform is provided, which can reduce a workload of a system.

The method for displaying media content applicable to a social platform includes:

detecting an input operation about a dynamic area located around a media content displaying area; and responding to the input operation, and scrolling to display, according to a layout direction of media content loaded in the media content displaying area, the media content in the media content displaying area, a width of the media content in a direction that is perpendicular to the layout direction of the media content being consistent with a width of the media content displaying area.

According to another aspect of the present invention, a system for applying media content applicable to a social platform is provided, including:

a detecting unit, configured to detect an input operation about a dynamic area located around a media content displaying area; and a control unit, configured to respond to the input operation, and scroll to display, according to a layout direction of media content loaded in the media content displaying area, the media content in the media content displaying area, a width of the media content in a direction that is perpendicular to the layout direction of the media content being consistent with a width of the media content displaying area.

According to another aspect of the present invention, a non-transitory computer readable storage medium is provided including computer readable program stored thereon. When being executed, the computer readable program causes one or more processors to execute a method for displaying media content applicable to a social platform. The method includes:

detecting an input operation about a dynamic area located around a media content displaying area; and responding to the input operation, and scrolling to display, according to a layout direction of media content loaded in the media content displaying area, the media content in the media content displaying area, a width of the media content in a direction that is perpendicular to the layout direction of the media content being consistent with a width of the media content displaying area.

It can be known from the foregoing technical solution that in the foregoing aspects of the present disclosure, when the input operation with respect to the dynamic area located around the media content displaying area is detected, the media content can be scrolled and displayed in the media content displaying area according to the layout direction of the media content loaded in the media content displaying area, so as to eventually display clear and complete media content. Compared with the existing technology, the foregoing aspects of the present disclosure do not need to intercept the media content, and also do not need to display a clear and complete picture by using a large picture floating layer, so as to reduce the workload of the system effectively.

BRIEF DESCRIPTION OF THE DRAWINGS

To describe the technical solutions of the embodiments of the present invention more clearly, the following briefly introduces the accompanying drawings required in the embodiments. Apparently, the accompanying drawings in the following description show only some embodiments of the present invention, and a person of ordinary skill in the art may still derive other drawings according to these accompanying drawings without creative efforts.

DESCRIPTION OF EMBODIMENTS

The following specifically describes the embodiments of the present invention with reference to the accompanying drawings in the embodiments of the present invention. Apparently, the described embodiments are merely some of the embodiments of the present invention rather than all of the embodiments. All other embodiments obtained by a person of ordinary skill in the art based on the embodiments of the present invention without creative efforts shall fall within the protection scope of the present disclosure.

Embodiments of the present invention provide a method, system, and storage medium for displaying media content applicable to a social platform, which can reduce a workload of a system. Specific description is provided separately below.

Figure 1:
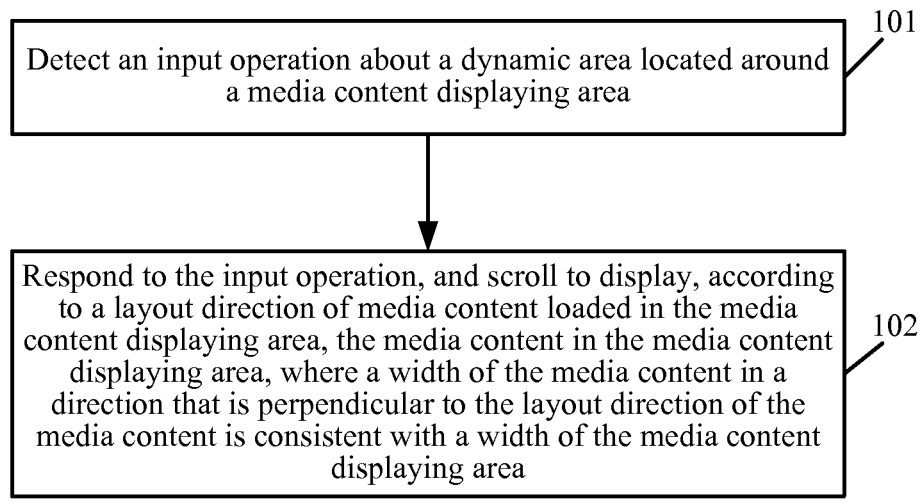
FIG. 1 illustrates a flowchart of a method for displaying media content applicable to a social platform according to an embodiment of the present invention.

Referring to FIG. 1, FIG. 1 is a flowchart of a method for displaying media content applicable to a social platform according to an embodiment of the present invention. The method for displaying media content applicable to a social platform described in FIG. 1 is applied to a social platform such as a friend circle, a microblog, a personal space, or instant messaging, where an application scenario is not specifically limited by the embodiment of the present invention. As shown in FIG. 1, the method for displaying media content applicable to a social platform described in the embodiment of the present invention can include the following steps beginning from step 101.

Step 101: Detecting an input operation about (or with respect to) a dynamic area located around a media content displaying area.

In an embodiment of the present invention, the foregoing input operation about a dynamic area located around a media content displaying area may include, but be not limited to, making a mouse pointer move to and hover over the dynamic area located around the media content displaying area.

In another embodiment of the present invention, the foregoing input operation about a dynamic area located around a media content displaying area may include, but be not limited to, touching, by a finger of a user, the dynamic area located around the media content displaying area by using a touch screen.

In the embodiment of the present invention, the media content may be a picture, a document, and the like, which is not limited by each embodiment of the present invention.

Step 102: Responding to the input operation, and scrolling to display, according to a layout direction of media content loaded in the media content displaying area, the media content in the media content displaying area. In the embodiment of the present invention, the width of the media content in a direction that is perpendicular to the layout direction of the media content is consistent with the width of the media content displaying area.

In the embodiment of the present invention, the layout direction of the media content generally adapts to a viewing habit of a user, for example, the layout of the media content may be top-down, bottom-up, left-right, and/or right-left.

Figure 2:
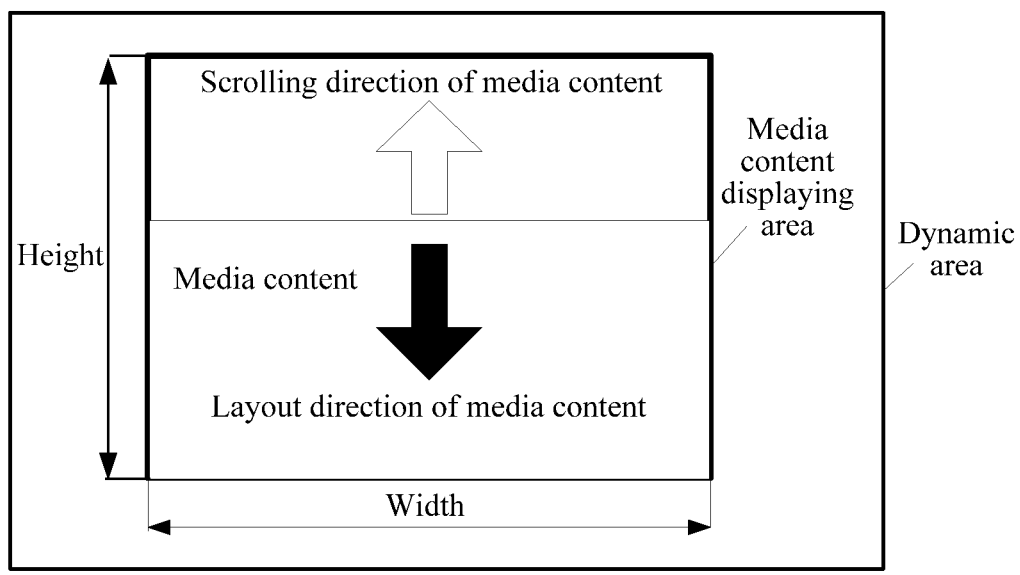
FIG. 2 illustrates a schematic diagram of a layout direction of media content and a scrolling direction of media content according to an embodiment of the present invention.

In an embodiment of the present invention, as shown in FIG. 2, if the layout direction of the media content is top-down (shown as a black arrow in FIG. 2), the scrolling to display, according to a layout direction of media content loaded in the media content displaying area, the media content in the media content displaying area in step 102 may specifically be:

scrolling to display, according to a bottom-up direction (shown as a white arrow in FIG. 2), the media content in the media content displaying area; further scrolling to display, according to a top-down direction, the media content in the media content displaying area when a bottom part of the media content is displayed in the media content displaying area; and repeatedly executing the input operation of scrolling to display, according to a bottom-up direction, the media content in the media content displaying area when a beginning part of the media content is displayed in the media content displaying area again.

Figure 3:
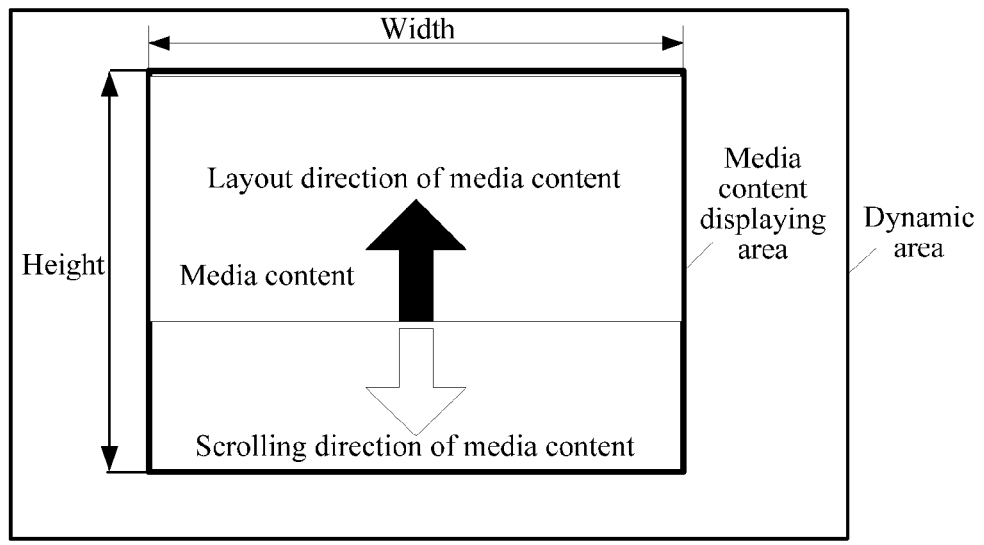
FIG. 3 illustrates a schematic diagram of a layout direction of media content and a scrolling direction of media content according to another embodiment of the present invention.

In another embodiment of the present invention, as shown in FIG. 3, if the layout direction of the media content is bottom-up (shown as a black arrow in FIG. 3), the scrolling to display, according to a layout direction of media content loaded in the media content displaying area, the media content in the media content displaying area in step 102 may specifically be:

scrolling to display, according to a top-down direction (shown as a white arrow in FIG. 3), the media content in the media content displaying area; further scrolling to display, according to a bottom-up direction, the media content in the media content displaying area when a bottom part of the media content is displayed in the media content displaying area; and repeatedly executing the operation/step of scrolling to display, according to a top-down direction, the media content in the media content displaying area when a beginning part of the media content is displayed in the media content displaying area again.

Figure 4:
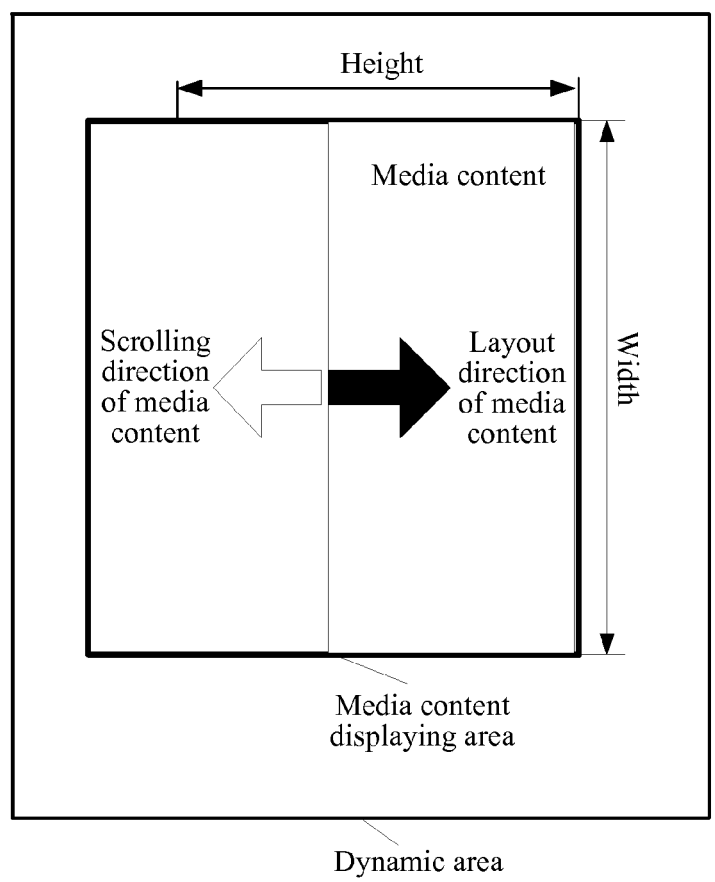
FIG. 4 illustrates a schematic diagram of a layout direction of media content and a scrolling direction of media content according to still another embodiment of the present invention.

In another embodiment of the present invention, as shown in FIG. 4, if the layout direction of the media content is left-right (shown as a black arrow in FIG. 4), the scrolling to display, according to a layout direction of media content loaded in the media content displaying area, the media content in the media content displaying area in step 102 may specifically be:

scrolling to display, according to a right-left direction (shown as a white arrow in FIG. 4), the media content in the media content displaying area; further scrolling to display, according to a left-right direction, the media content in the media content displaying area when a bottom part of the media content is displayed in the media content displaying area; and repeatedly executing the operation/step of scrolling to display, according to a right-left direction, the media content in the media content displaying area when a beginning part of the media content is displayed in the media content displaying area again.

Figure 5:
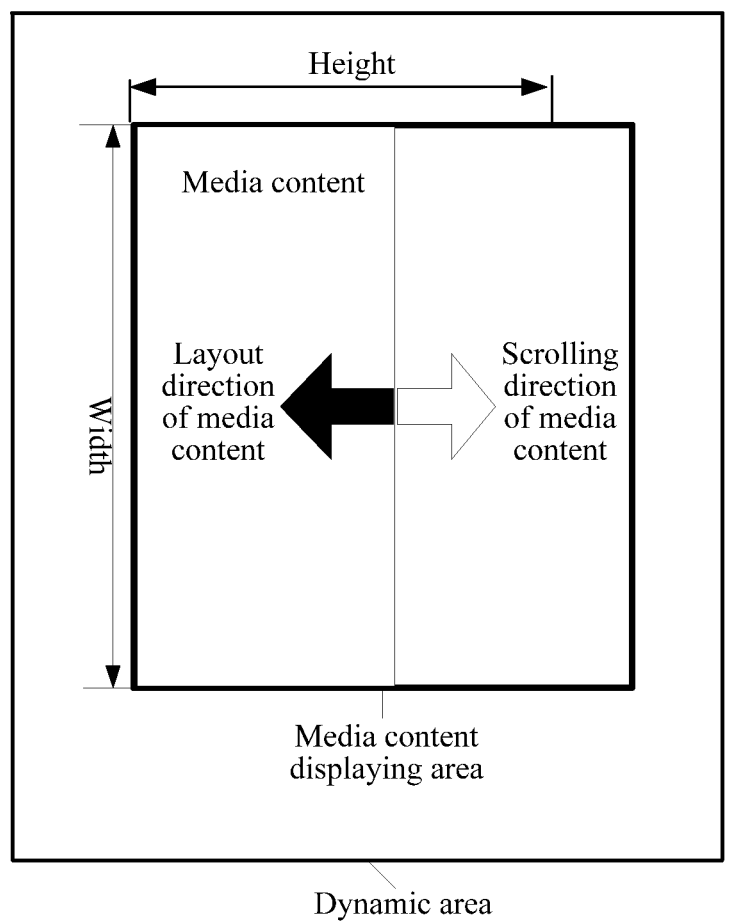
FIG. 5 illustrates a schematic diagram of a layout direction of media content and a scrolling direction of media content according to yet another embodiment of the present invention.

In yet another embodiment of the present invention, as shown in FIG. 5, if the layout direction of the media content is right-left (shown as a black arrow in FIG. 5), the scrolling to display, according to a layout direction of media content loaded in the media content displaying area, the media content in the media content displaying area in step 102 may specifically be:

scrolling to display, according to a left-right direction (shown as a white arrow in FIG. 5), the media content in the media content displaying area; further scrolling to display, according to a right-left direction, the media content in the media content displaying area when a bottom part of the media content is displayed in the media content displaying area; and repeatedly executing the operation/step of scrolling to display, according to a left-right direction, the media content in the media content displaying area when a beginning part of the media content is displayed in the media content displaying area again.

In an embodiment of the present invention, the height of the media content in a direction that is the same as the layout direction of the media content is greater than or equal to the height of the media content displaying area.

In an embodiment of the present invention, before step 101, the method for displaying media content applicable to a social platform described in FIG. 1 at least may further include the following steps:

Step A: Receiving uploaded media content having a size that exceeds the media content displaying area.

Step B: Scaling up the media content having the size that exceeds the media content displaying area in a geometric proportion, so as to make the width of the media content after being scaled up in the geometric proportion in a direction that is perpendicular to a layout direction of the media content after being scaled up in the geometric proportion be consistent with the width of the media content displaying area.

The height of the media content after being scaled up in the geometric proportion in a direction that is the same as the layout direction of the media content after being scaled up in the geometric proportion is greater than or equal to the height of the media content displaying area.

Step C: Loading, according to the layout direction of the media content after being scaled up in the geometric proportion, the media content after being scaled up in the geometric proportion to the media content displaying area, so as to make a beginning part of the media content after being scaled up in the geometric proportion be displayed in the media content displaying area.

In an embodiment of the present invention, media content after being scaled up in a geometric proportion can be loaded to a media content displaying area by means of lazy load to serve as a loaded picture.

In the method for displaying media content applicable to a social platform described in FIG. 1, when the input operation about the dynamic area located around the media content displaying area is detected, the media content can be scrolled and displayed in the media content displaying area according to the layout direction of the media content loaded in the media content displaying area, so as to eventually display clear and complete media content. Compared with the existing technology, the method described in FIG. 1 of the present disclosure does not need to intercept the media content, and also does not need to display a clear and complete picture by using a large picture floating layer, so as to reduce the workload of the system effectively.

A method for displaying media content applicable to a social platform according to an embodiment of the present invention is specifically described above.

A method for displaying media content applicable to a social platform is further provided according to another embodiment of the present invention.

Figure 6:
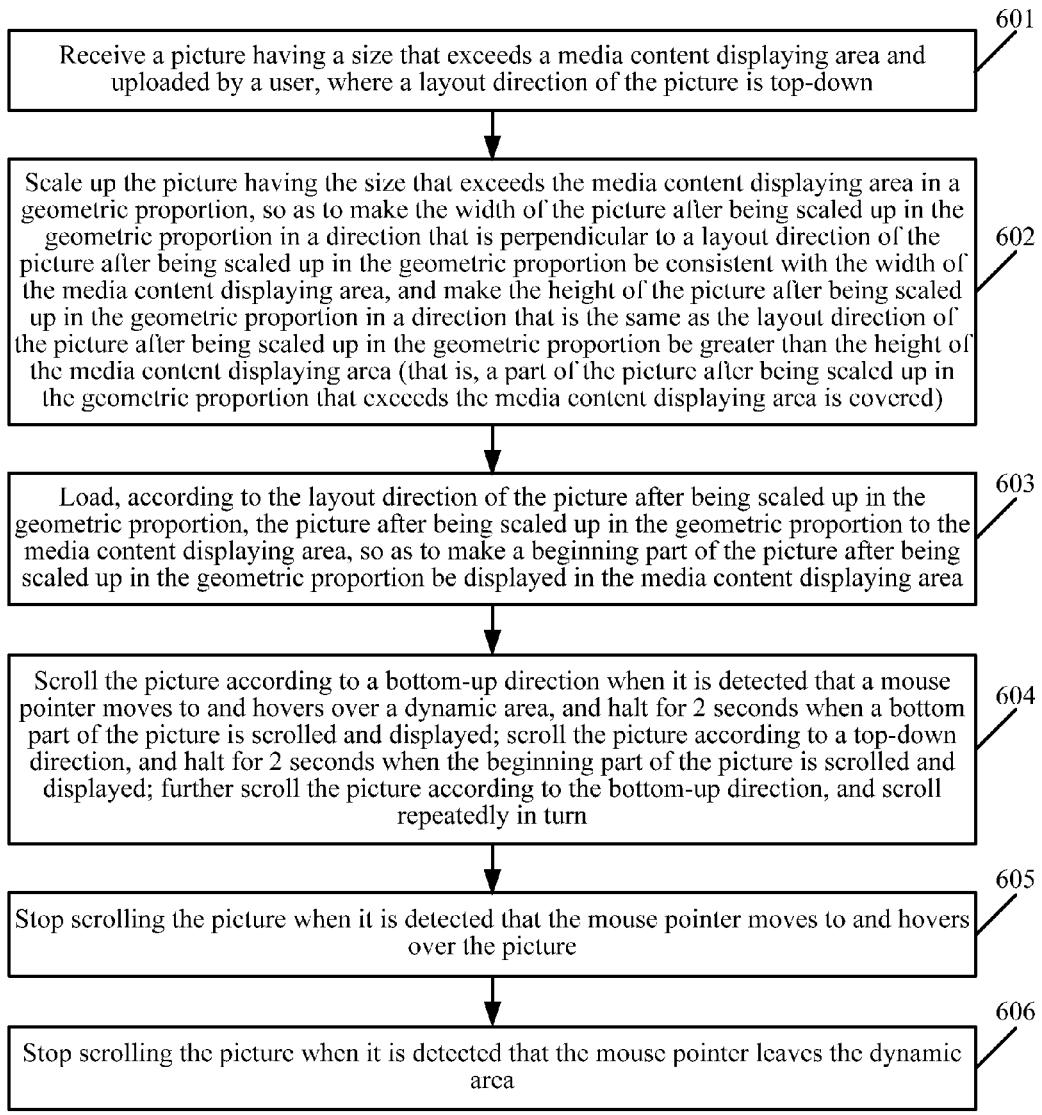
FIG. 6 illustrates a flowchart of a method for displaying media content applicable to a social platform according to another embodiment of the present invention.

Referring to FIG. 6, FIG. 6 is a flowchart of a method for displaying media content applicable to a social platform according to another embodiment of the present invention. The method for displaying media content applicable to a social platform described in FIG. 6 is applied to a social platform such as a friend circle, a microblog, personal space, or instant messaging, where an application scenario is not specifically limited by the embodiment of the present invention. As shown in FIG. 6, the method for displaying media content applicable to a social platform described in the embodiment of the present invention can include the following steps beginning from step 601.

Step 601: Receiving a picture having a size that exceeds a media content displaying area and uploaded by a user, where a layout direction of the picture is top-down.

Step 602: Scaling up the picture having the size that exceeds the media content displaying area in a geometric proportion, so as to make the width of the picture after being scaled up in the geometric proportion in a direction that is perpendicular to a layout direction of the picture after being scaled up in the geometric proportion be consistent with the width of the media content displaying area, and make the height of the picture after being scaled up in the geometric proportion in a direction that is the same as the layout direction of the picture after being scaled up in the geometric proportion be greater than the height of the media content displaying area (that is, a part of the picture after being scaled up in the geometric proportion that exceeds the media content displaying area is covered).

Step 603: Loading, according to the layout direction of the picture after being scaled up in the geometric proportion, the picture after being scaled up in the geometric proportion to the media content displaying area, so as to make a beginning part of the picture after being scaled up in the geometric proportion be displayed in the media content displaying area.

Step 604: Scrolling the picture according to a bottom-up direction when it is detected that a mouse pointer moves to and hovers over a dynamic area, and halt for a threshold time (such as 2 seconds) when a bottom part of the picture is scrolled and displayed; scrolling the picture according to a top-down direction, and halt for the threshold time (such as 2 seconds) when the beginning part of the picture is scrolled and displayed; further scrolling the picture according to the bottom-up direction, and scrolling repeatedly in turn.

Step 605: Stopping scrolling the picture when it is detected that the mouse pointer moves to and hovers over the picture.

Step 606: Stopping scrolling the picture when it is detected that the mouse pointer leaves the dynamic area.

In an embodiment of the present invention, when the mouse pointer hovers over the picture or leaves the dynamic area, the picture stops scrolling; a system can record a current position and a scrolling direction of the picture, and successively start scrolling from the current position and the scrolling direction next time.

In the method for displaying media content applicable to a social platform described in FIG. 6 of the present disclosure, the system does not need to display a clear and complete picture by using a large picture floating layer, so as to reduce a workload of the system effectively.

A method for displaying media content applicable to a social platform according to an embodiment of the present invention is specifically described above.

A system for displaying media content applicable to a social platform is further provided according to another embodiment of the present invention.

Figure 7:
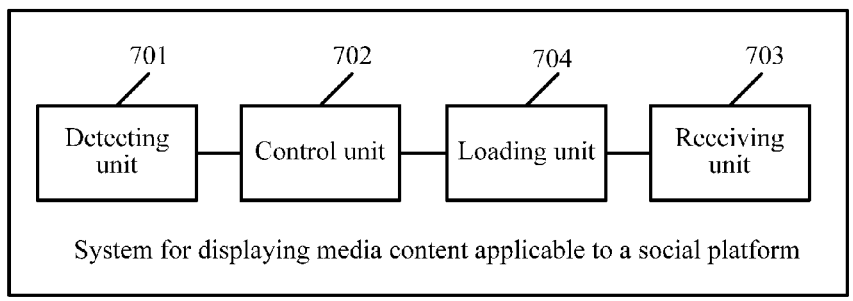
FIG. 7 illustrates a structural diagram of a system for displaying media content applicable to a social platform according to an embodiment of the present invention.

Referring to FIG. 7, FIG. 7 is a structural diagram of a system for displaying media content applicable to a social platform according to an embodiment of the present invention. The system for displaying media content applicable to a social platform described in FIG. 7 is applied to a social platform such as a friend circle, a microblog or personal space, where an application scenario is not specifically limited by the embodiment of the present invention. As shown in FIG. 7, the system for displaying media content applicable to a social platform may include: a detecting unit 701 and a control unit 702.

The detecting unit 701 is configured to detect an input operation about a dynamic area located around a media content displaying area.

The control unit 702 is configured to respond to the input operation, and scroll to display, according to a layout direction of media content loaded in the media content displaying area, the media content in the media content displaying area, where the width of the media content in a direction that is perpendicular to the layout direction of the media content is consistent with the width of the media content displaying area.

In an embodiment of the present invention, the system for displaying media content applicable to a social platform described in FIG. 7 may further include: a receiving unit 703 and a loading unit 704.

The receiving unit 703 is configured to receive uploaded media content having a size that exceeds the media content displaying area before the detecting unit 701 detects the input operation about the dynamic area located around the media content displaying area.

The loading unit 704 is configured to scale up the media content having the size that exceeds the media content displaying area in a geometric proportion, so as to make the width of the media content after being scaled up in the geometric proportion in a direction that is perpendicular to a layout direction of the media content after being scaled up in the geometric proportion be consistent with the width of the media content displaying area. The loading unit 704 is further configured to load, according to the layout direction of the media content after being scaled up in the geometric proportion, the media content after being scaled up in the geometric proportion to the media content displaying area, so as to make a beginning part of the media content after being scaled up in the geometric proportion be displayed in the media content displaying area.

In an embodiment of the present invention, the layout direction of the media content is top-down, and the control unit 702 is configured to respond to the input operation, and scroll to display, according to a bottom-up direction, the media content in the media content displaying area; further scroll to display, according to a top-down direction, the media content in the media content displaying area when a bottom part of the media content is displayed in the media content displaying area; and repeatedly execute the input operation of scrolling to display, according to a bottom-up direction, the media content in the media content displaying area when the beginning part of the media content is displayed in the media content displaying area again.

In another embodiment of the present invention, the layout direction of the media content is bottom-up, and the control unit 702 is configured to respond to the input operation, and scroll to display, according to a top-down direction, the media content in the media content displaying area; further scroll to display, according to a bottom-up direction, the media content in the media content displaying area when a bottom part of the media content is displayed in the media content displaying area; and repeatedly execute the input operation of scrolling to display, according to a top-down direction, the media content in the media content displaying area when the beginning part of the media content is displayed in the media content displaying area again.

In another embodiment of the present invention, the layout direction of the media content is left-right, and the control unit 702 is configured to respond to the input operation, and scroll to display, according to a right-left direction, the media content in the media content displaying area; further scroll to display, according to a left-right direction, the media content in the media content displaying area when a bottom part of the media content is displayed in the media content displaying area; and repeatedly execute the operation/step of scrolling to display, according to a right-left direction, the media content in the media content displaying area when the beginning part of the media content is displayed in the media content displaying area again.

In another embodiment of the present invention, the layout direction of the media content is right-left, and the control unit 702 is configured to respond to the input operation, and scroll to display, according to a left-right direction, the media content in the media content displaying area; further scroll to display, according to a right-left direction, the media content in the media content displaying area when a bottom part of the media content is displayed in the media content displaying area; and repeatedly execute the operation/step of scrolling to display, according to a left-right direction, the media content in the media content displaying area when the beginning part of the media content is displayed in the media content displaying area again.

In other embodiments of the present invention, the method for displaying media content displaying method applied to a social platform shown according to FIG. 1 and FIG. 6 can be a method for displaying media content applicable to a social platform executed by each unit in the system for displaying media content applicable to a social platform shown in FIG. 7. For example, step 101 shown in FIG. 1 can be executed by the detecting unit 701 shown in FIG. 7; step 102 shown in FIG. 1 and steps 604, 605 and 606 shown in FIG. 6 can be executed by the control unit 702 shown in FIG. 7; step A and step 601 shown in FIG. 6 can be executed by the receiving unit 703 shown in FIG. 7; and steps B and C and steps 602 and 603 shown in FIG. 6 can be executed by the loading unit 704 shown in FIG. 6.

In other embodiments of the present invention, each of the units of the system for displaying media content applicable to a social platform shown in FIG. 6 can be constructed by respectively or entirely combining the units into one or several other units, or can be constructed by further dividing a (some) unit(s) into multiple units that are functionally smaller, which can implement a same operation, and does not affect implementation of a technical effect of the embodiment of the present invention. The foregoing units are divided based on a logic function, and in actual applications, a function of a unit may also be implemented by multiple units, or functions of multiple units may be implemented by a unit. In other embodiments of the present invention, the system for displaying media content applicable to a social platform may also include other modules. However, in actual applications, these functions may also be implemented with assistance of another unit, and may be implemented with cooperation of multiple units.

Figure 8:
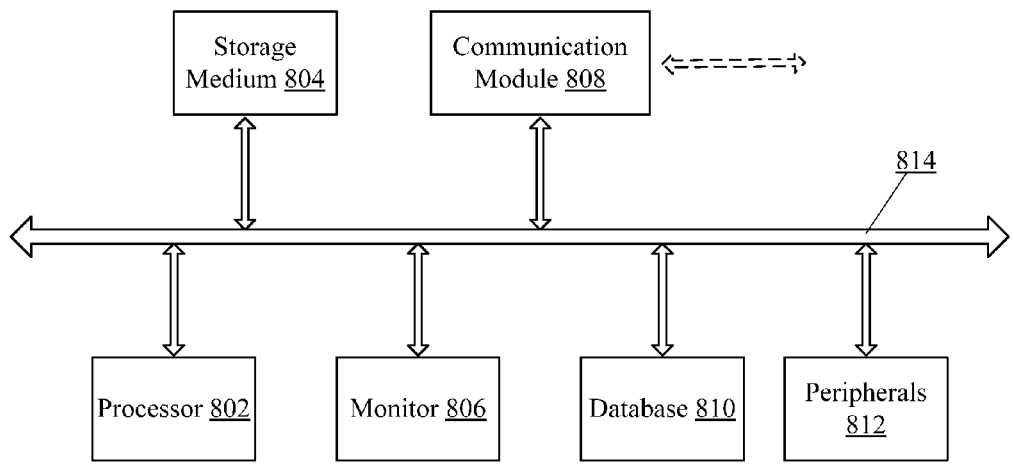
FIG. 8 illustrates an exemplary computing device consistent with the disclosed embodiments.

According to another embodiment of the present invention, the system for displaying media content applicable to a social platform shown in FIG. 8 can be constructed and the method for displaying media content applicable to a social platform according to the embodiment of the present invention can be implemented by running computer programs (including program codes) that can carry out the method for displaying media content applicable to a social platform shown in FIG. 1 on a universal computing device such as a computer including a processing unit and a storage medium, as shown in FIG. 8. The computer programs may be recorded on, for example, a non-transitory computer readable record medium, and can be loaded into the foregoing computing device by using the computer readable record medium and to run in the foregoing computing device.

The storage medium may include: a flash drive, a read-only memory (ROM), a random access memory (RAM), a magnetic disk, an optical disc, or the like.

In the system describe in FIG. 7 of the present disclosure, when the input operation about the dynamic area located around the media content displaying area is detected, the media content can be scrolled and displayed in the media content displaying area according to the layout direction of the media content loaded in the media content displaying area, so as to eventually display clear and complete media content. Compared with the existing technology, the system described in FIG. 7 does not need to intercept the media content, and also does not need to display a clear and complete picture by using a large picture floating layer, so as to reduce a workload of the system effectively.

For example, FIG. 8 illustrates an exemplary computing device capable of implementing the disclosed methods, consistent with the disclosed embodiments. As shown in FIG. 8, the exemplary computing device 800 may include a processor 802, a storage medium 804, a monitor 806, a communication module 808, a database 810, peripherals 812, and one or more bus 814 to couple the devices together. Certain devices may be omitted and other devices may be included.

Processor 802 may include any appropriate processor or processors. Further, processor 802 may include multiple cores for multi-thread or parallel processing. The processor 802 may be used to run computer program(s) stored in the storage medium 804. Storage medium 804 may include memory modules, such as ROM, RAM, and flash memory modules, and mass storages, such as CD-ROM, U-disk, removable hard disk, etc. Storage medium 804 may store computer programs for implementing various disclosed processes, when executed by processor 802. In one embodiment, storage medium 804 may be a non-transient computer-readable storage medium having a computer program stored thereon, when being executed, to cause the computer to implement the disclosed methods.

Further, peripherals 812 may include I/O devices such as keyboard and mouse, and communication module 808 may include network devices for establishing connections, e.g., through a communication network such as the Internet. Database 810 may include one or more databases for storing certain data and for performing certain operations on the stored data, such as webpage browsing, database searching, etc.

In one embodiment, the disclosed wireless communication apparatus may include the computing device illustrated in FIG. 8. For example, the wireless communication apparatus may include one or more processors and a non-transitory computer-readable storage medium having instructions/programs stored thereon, the instructions/programs executed by the one or more processors and comprising the modules and units disclosed in the wireless communication apparatus.

The method and system provided by the embodiments of the present invention are specifically described above, and specific examples are used herein to explain the principles and the implementation manners of the present disclosure, where the description of the above embodiments are merely used to help understand the method and the core ideas of the present disclosure; meanwhile, for a person of ordinary skill in the art, modifications may be made to both the specific implementation manners and the application scope according to the ideas of the present disclosure; and in conclusion, content of the specification should not be understood as a limitation to the present disclosure.

What is claimed is:

1. A method for displaying media content applicable to a social platform, comprising:
   providing a user interface including a media content displaying area and a dynamic area, wherein the dynamic area and the media content display area share at least two borders;
   detecting an input operation performed in the dynamic area; and
   in response to the input operation, automatically scrolling to display, according to a layout direction of media content loaded in the media content displaying area, the media content in the media content displaying area,
   wherein:
   the layout direction of the media content is adapted to a viewing habit of a user, and includes top-down, bottom-up, left-right, or right-left,
   a width of the media content in a direction that is perpendicular to the layout direction of the media content is consistent with a width of the media content displaying area, and
   during the scrolling display of the media content in the media content displaying area, presentation of the dynamic area is unchanged.

2. The method according to claim 1, before the step of detecting an input operation about the dynamic area located around the media content displaying area, further comprising:
   receiving uploaded media content having a size that exceeds the media content displaying area;
   scaling up the media content having the size that exceeds the media content displaying area in a geometric proportion, so as to make the width of the media content after being scaled up in the geometric proportion in a direction that is perpendicular to a layout direction of the media content after being scaled up in the geometric proportion be consistent with the width of the media content displaying area; and
   loading, according to the layout direction of the media content after being scaled up in the geometric proportion, the media content after being scaled up in the geometric proportion to the media content displaying area, so as to make a beginning part of the media content after being scaled up in the geometric proportion be displayed in the media content displaying area.

3. The method according to claim 2, wherein a height of the media content after being scaled up in the geometric proportion in a direction that is the same as the layout direction of the media content after being scaled up in the geometric proportion is greater than or equal to a height of the media content displaying area.

4. The method according to claim 2, wherein:
the layout direction of the media content is top-down, and
the step of scrolling to display, according to the layout direction of media content loaded in the media content displaying area, the media content in the media content displaying area includes:
scrolling to display, according to a bottom-up direction, the media content in the media content displaying area;
further scrolling to display, according to a top-down direction, the media content in the media content displaying area when a bottom part of the media content is displayed in the media content displaying area; and
repeatedly executing the step of scrolling to display, according to the bottom-up direction, the media content in the media content displaying area, when the beginning part of the media content is displayed in the media content displaying area again.

5. The method according to claim 1, further comprising:
detecting a first operation performed in the media content displaying area, the first operation being a current cursor hovering over the media content displaying area; and
in response to detection of the first operation, stopping automatically scrolling the media content.

6. The method according to claim 1, further comprising:
detecting a second operation that a current cursor leaving the dynamic area; and
in response to detection of the second operation, stopping automatically scrolling the media content.

7. The method according to claim 1, wherein:
the input operation includes, sequentially, a current cursor moving into the dynamic area, hovering over the dynamic area, and halting for a threshold time.

8. A system for displaying media content applicable to a social platform, comprising: a memory, and a processor configured to:
provide a user interface including a media content displaying area and a dynamic area, wherein the dynamic area and the media content display area share at least two borders;
detect an input operation performed in the dynamic area; and
in response to the input operation, automatically scroll to display, according to a layout direction of media content loaded in the media content displaying area, the media content in the media content displaying area, wherein:
the layout direction of the media content is adapted to a viewing habit of a user, and includes top-down, bottom-up, left-right, or right-left,
a width of the media content in a direction that is perpendicular to the layout direction of the media content is consistent with a width of the media content displaying area, and
during the scrolling display of the media content in the media content displaying area, presentation of the dynamic area is unchanged.

9. The system according to claim 8, wherein the processor is further configured to:
receive uploaded media content having a size that exceeds the media content displaying area before the detecting unit detects the input operation about the dynamic area located around the media content displaying area; and
scale up the media content having the size that exceeds the media content displaying area in a geometric proportion, so as to make the width of the media content after being scaled up in the geometric proportion in a direction that is perpendicular to a layout direction of the media content after being scaled up in the geometric proportion be consistent with the width of the media content displaying area.

10. The system according to claim 9, wherein the processor is further configured to load, according to the layout direction of the media content after being scaled up in the geometric proportion, the media content after being scaled up in the geometric proportion to the media content displaying area, so as to make a beginning part of the media content after being scaled up in the geometric proportion be displayed in the media content displaying area.

11. The system according to claim 9, wherein a height of the media content after being scaled up in the geometric proportion in a direction that is the same as the layout direction of the media content after being scaled up in the geometric proportion is greater than or equal to a height of the media content displaying area.

12. The system according to claim 9, wherein:
the layout direction of the media content is top-down, and
the processor is configured to:
respond to the input operation, and scroll to display, according to a bottom-up direction, the media content in the media content displaying area;
further scroll to display, according to a top-down direction, the media content in the media content displaying area, when a bottom part of the media content is displayed in the media content displaying area; and
repeatedly execute the operation of scrolling to display, according to the bottom-up direction, the media content in the media content displaying area when the beginning part of the media content is displayed in the media content displaying area again.

13. The system according to claim 9, wherein:
the layout direction of the media content is bottom-up, and
the processor is configured to:
respond to the input operation, and scroll to display, according to a top-down direction, the media content in the media content displaying area;
further scroll to display, according to a bottom-up direction, the media content in the media content displaying area, when a bottom part of the media content is displayed in the media content displaying area; and
repeatedly execute the operation of scrolling to display, according to the top-down direction, the media content in the media content displaying area, when the beginning part of the media content is displayed in the media content displaying area again.

14. The system according to claim 9, wherein:
the layout direction of the media content is left-right, and
the processor is configured to:
respond to the input operation, and scroll to display, according to a right-left direction, the media content in the media content displaying area;
further scroll to display, according to a left-right direction, the media content in the media content displaying area, when a bottom part of the media content is displayed in the media content displaying area; and
repeatedly execute the operation of scrolling to display, according to the right-left direction, the media content in the media content displaying area when the beginning part of the media content is displayed in the media content displaying area again.

15. The system according to claim 9, wherein:
the layout direction of the media content is right-left, and the processor is configured to:
respond to the input operation, and scroll to display, according to a left-right direction, the media content in the media content displaying area;
further scroll to display, according to a right-left direction, the media content in the media content displaying area, when a bottom part of the media content is displayed in the media content displaying area; and
repeatedly execute the operation of scrolling to display, according to the left-right direction, the media content in the media content displaying area when the beginning part of the media content is displayed in the media content displaying area again.

16. A non-transitory computer readable storage medium comprising computer readable program stored thereon, wherein, when being executed, the computer readable program causes one or more processors to execute a method for displaying media content applicable to a social platform, and the method comprising:
providing a user interface including a media content displaying area and a dynamic area, wherein the dynamic area and the media content display area share at least two borders;
detecting an input operation performed in the dynamic area; and
in response to the input operation, automatically scrolling to display, according to a layout direction of media content loaded in the media content displaying area, the media content in the media content displaying area,
wherein:
the layout direction of the media content is adapted to a viewing habit of a user, and includes top-down, bottom-up, left-right, or right-left,
a width of the media content in a direction that is perpendicular to the layout direction of the media content is consistent with a width of the media content displaying area, and
during the scrolling display of the media content in the media content displaying area, presentation of the dynamic area is unchanged.

17. The non-transitory computer readable storage medium according to claim 16, before the step of detecting an input operation about the dynamic area located around the media content displaying area, further comprising:
receiving uploaded media content having a size that exceeds the media content displaying area;
scaling up the media content having the size that exceeds the media content displaying area in a geometric proportion, so as to make the width of the media content after being scaled up in the geometric proportion in a direction that is perpendicular to a layout direction of the media content after being scaled up in the geometric proportion be consistent with the width of the media content displaying area; and
loading, according to the layout direction of the media content after being scaled up in the geometric proportion, the media content after being scaled up in the geometric proportion to the media content displaying area, so as to make a beginning part of the media content after being scaled up in the geometric proportion be displayed in the media content displaying area.

18. The non-transitory computer readable storage medium according to claim 17, wherein a height of the media content after being scaled up in the geometric proportion in a direction that is the same as the layout direction of the media content after being scaled up in the geometric proportion is greater than or equal to a height of the media content displaying area.

19. The non-transitory computer readable storage medium according to claim 17, wherein:
the layout direction of the media content is top-down, and
the step of scrolling to display, according to the layout direction of media content loaded in the media content displaying area, the media content in the media content displaying area includes:
scrolling to display, according to a bottom-up direction, the media content in the media content displaying area;
further scrolling to display, according to a top-down direction, the media content in the media content displaying area when a bottom part of the media content is displayed in the media content displaying area; and
repeatedly executing the step of scrolling to display, according to the bottom-up direction, the media content in the media content displaying area, when the beginning part of the media content is displayed in the media content displaying area again.

20. The non-transitory computer readable storage medium according to claim 17, wherein:
the layout direction of the media content is left-right, and
the step of scrolling to display, according to the layout direction of media content loaded in the media content displaying area, the media content in the media content displaying area includes:
scrolling to display, according to a right-left direction, the media content in the media content displaying area;
further scrolling to display, according to a left-right direction, the media content in the media content displaying area, when a bottom part of the media content is displayed in the media content displaying area; and
repeatedly executing the step of scrolling to display, according to the right-left direction, the media content in the media content displaying area, when the beginning part of the media content is displayed in the media content displaying area again.

* * * * *